United States Patent [19]

Shumard et al.

[11] 4,423,901
[45] Jan. 3, 1984

[54] MOUNTING HARDWARE FOR A MOTORCYCLE FAIRING

[75] Inventors: Thomas D. Shumard, Santa Margarita; Peter B. Evans, San Luis Obispo; Charles M. Perethian, Arroyo Grande, all of Calif.

[73] Assignee: First Champaign Corporation, Rantoul, Ill.

[21] Appl. No.: 305,322

[22] Filed: Sep. 24, 1981

Related U.S. Application Data

[63] Continuation of Ser. No. 118,528, Feb. 4, 1980, abandoned.

[51] Int. Cl.³ ............................................. B62J 17/00
[52] U.S. Cl. .............................. 296/78.1; 280/289 G; 280/289 S
[58] Field of Search ........................... 296/78.1, 84 R; 280/289 R, 289 G, 289 S

[56] References Cited

U.S. PATENT DOCUMENTS

| | | | |
|---|---|---|---|
| 2,675,266 | 4/1954 | Comiskey | 296/78.1 |
| 3,154,342 | 10/1964 | Mueller | 296/78.1 |
| 3,866,971 | 2/1975 | Hugon | 296/78.1 |
| 4,010,976 | 3/1977 | Shields | 296/78.1 |
| 4,019,774 | 4/1977 | Tsukuhara | 296/78.1 |
| 4,022,487 | 5/1977 | Leahy | 296/78.1 |
| 4,082,345 | 4/1978 | Willey | 296/78.1 |
| 4,130,315 | 12/1978 | Shields | 296/78.1 |
| 4,135,758 | 1/1979 | Clements | 296/78.1 |
| 4,166,650 | 9/1979 | Saunders | 280/289 S |
| 4,331,344 | 5/1982 | Velter | 296/78.1 |

FOREIGN PATENT DOCUMENTS

| | | | |
|---|---|---|---|
| 32259 | 3/1922 | Denmark | 296/78.1 |

Primary Examiner—Robert R. Song
Attorney, Agent, or Firm—Wood, Dalton, Phillips, Mason & Rowe

[57] ABSTRACT

A motorcycle fairing mounting apparatus having a pair of vertically spaced, transversely extending cross members which mate with the motorcycle frame and support a pair of longitudinally extending side plates having upwardly facing mounting surfaces which mate with complementary mounting surfaces of a fairing. The central portion of the lower cross member is bowed downwardly from the ends of the cross members. In a preferred form of the apparatus, a forward portion of each side plate converges forwardly toward the other side plate forward portion.

9 Claims, 4 Drawing Figures

MOUNTING HARDWARE FOR A MOTORCYCLE FAIRING

This a continuation of application Ser. No. 118,528 filed Feb. 4, 1980 now abandoned.

This invention is concerned with an apparatus for mounting a fairing to a motorcycle frame.

BACKGROUND OF THE INVENTION

Commonly assigned copending application of Craig W. Vetter, Ser. No. 92,839 filed Nov. 9, 1979, now abandoned in favor of continuation application Ser. No. 298,003, filed Aug. 31, 1981, and entitled "Fairing Mounting Apparatus," the details of which are incorporated herein by reference, discloses a fairing mounting apparatus including a carrier comprising at least one cross bar secured to a motorcycle frame so that it extends generally transversely thereof and having end portions that are laterally spaced on either side of the frame. Fairing mounting plates are secured to the carrier end portions and have supporting surfaces that receive mounting surfaces of the fairing.

The carrier of application Ser. No. 92,839 has surfaces which mate with the motorcycle frame to locate the carrier in a desired position and to prevent mounting of the carrier in an incorrect position.

In a preferred embodiment of the foregoing apparatus, the carrier comprises a pair of vertically spaced cross bars, and the side plates are connected at their forward ends by a transversely extending horizontal mounting plate which defines a fairing supporting surface. The side plates engage the fairing at generally vertical mounting surfaces located on the fairing adjacent the side plates.

In another form of the apparatus, associated pairs of generally horizontal and vertical fairing supporting surfaces are carried by the side plates. The generally vertical supporting surfaces are located at the forward end of each side plate substantially above the horizontal supporting surfaces. The side plates are necessarily elongate and extend a substantial distance upwardly and forwardly of the cross bars. The fairing requires two pairs of mounting surfaces.

SUMMARY OF THE INVENTION

A principal feature of the invention is a fairing mounting apparatus comprising a pair of transversely extending, vertically spaced cross members secured at their ends to a pair of laterally spaced side plates. Each side plate has a generally longitudinally extending, upwardly facing fairing supporting surface for engagement with a complementary downwardly facing mounting surface on a fairing. The lower of the cross members has a central portion bowed downwardly from its ends, thereby reducing the required side plate height.

Another feature of the invention is that each side plate may comprise a rear portion substantially parallel to the other side plate rear portion and to the longitudinal axis of the motorcycle, and a forward portion converging toward the other side forward portion. This structure reduces the required width of the fairing.

A further feature is a fairing which has a pair of downwardly facing, generally longitudinally extending mounting surfaces complementary to and engageable with the mounting surfaces of the apparatus. The fairing mounting surfaces are recessed upwardly from the fairing's lower outer edges, and are spaced laterally inwardly from the fairing's outer surface to provide a low profile when mounted on the apparatus of the invention.

Further features and advantages of the invention will be readily apparent from the following specification and from the drawings.

DETAILED DESCRIPTION OF THE PREFERRED EMBODIMENT

Figure 1:
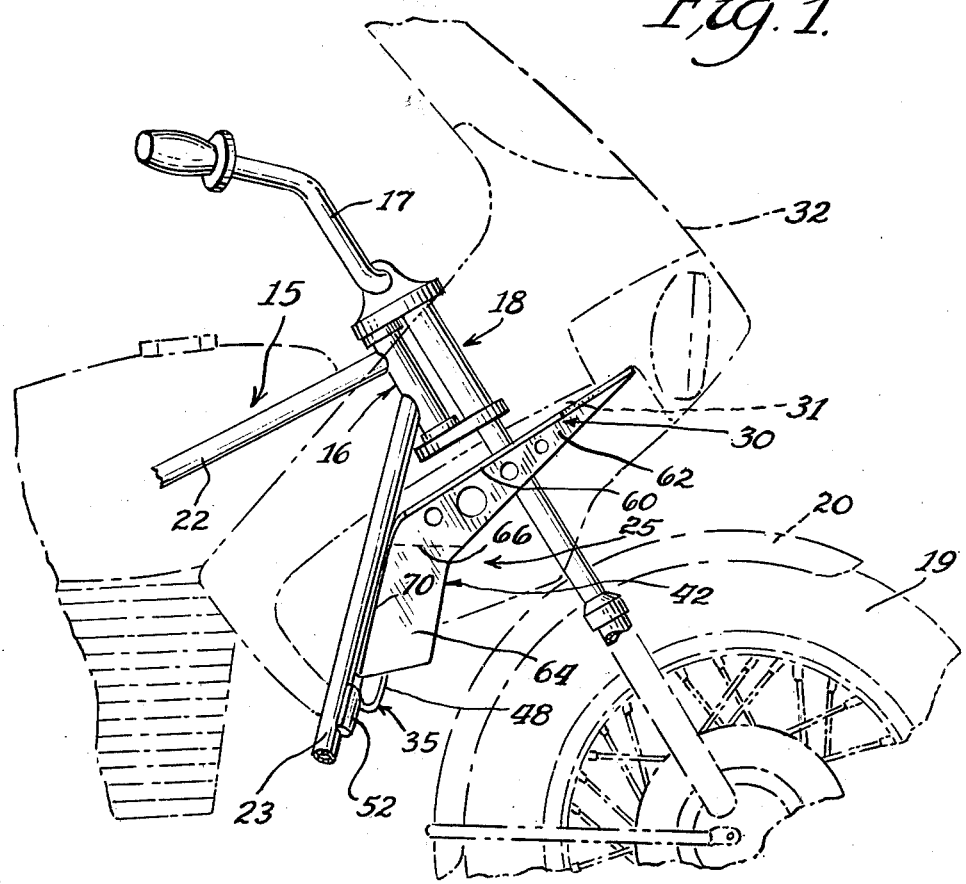
FIG. 1 is a fragmentary elevation of a motorcycle with a fairing and the fairing mounting apparatus of the invention mounted thereon, with a fairing outline in broken lines.

FIG. 1 illustrates a motorcycle frame 15 having a rearwardly inclined fork head 16 in which a pair of handlebars 17 and a front wheel fork 18 are mounted. The front wheel 19 and fender 20 are carried by the front wheel fork 18. An upper frame member 22 extends rearwardly from the fork head 16 and a pair of tubular frame members 23, conventionally referred to as "down tubes", extend rearwardly and downwardly from the fork head 16 and diverge from each other, one on either side of the longitudinal center plane of the motorcycle. (Only one down tube 23 is shown in FIG. 1.)

A fairing mounting apparatus, generally designated 25, is secured to the down tubes 23. Means for securing the mounting apparatus 25 to the down tubes 23 are not shown but are described below. A portion of the fairing mounting apparatus 25 extends generally forwardly from the down tubes 23 and includes fairing supporting surfaces 30 engaging complementary mounting surfaces 31 of a fairing 32. The apparatus 25 is secured to and carries the fairing 32 above the front wheel 19.

Figure 2:
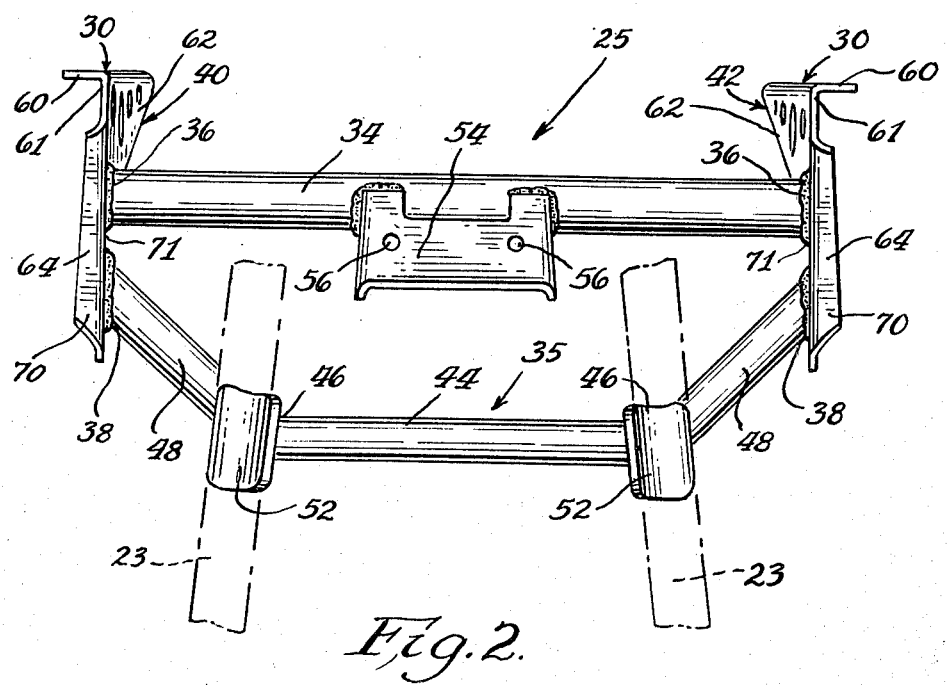
FIG. 2 is a rear elevation of the fairing mounting apparatus of FIG. 1 with some frame elements shown in broken lines.
Figure 3:
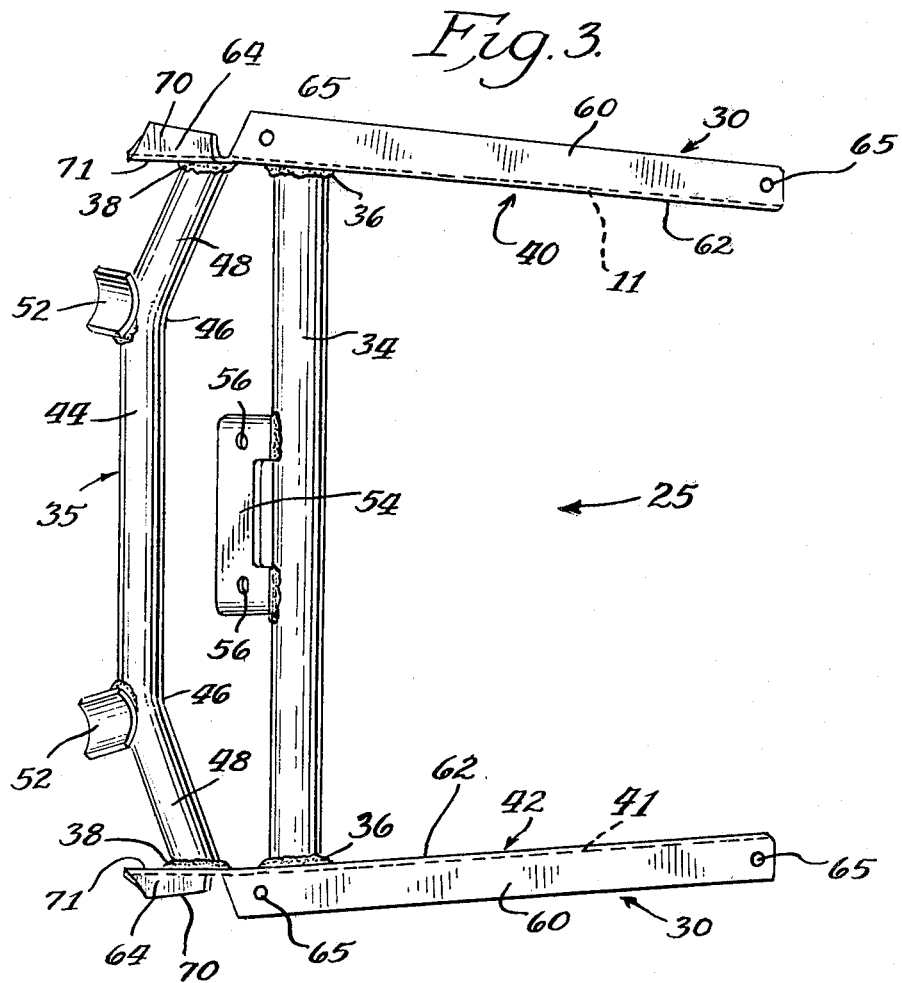
FIG. 3 is an overhead plan view of the fairing mounting apparatus of FIG. 2.

Referring to FIGS. 2 and 3, the fairing mounting apparatus 25 is described in detail. The apparatus comprises upper and lower vertically spaced, transversely extending cross members 34 and 35, respectively, secured at their respective ends 36, 38 to a pair of laterally spaced side plates 40, 42. The cross members 34, 35 are preferably tubular, but may be solid, and need not have a circular cross section. Although the cross members 34, 35 of FIGS. 2 and 3 are welded to the side plates 40, 42, they may be secured thereto by any convenient means, such as by bolts extending through the plates 40, 42 and axially into the cross members 34, 35.

The lower cross member 35 has a central portion 44 which extends downwardly with respect to the ends 38. Preferably, the central portion 44 is defined by a pair of laterally spaced bends 46 which separate the central section 44 from a pair of laterally spaced end sections 18.

The upper cross member 34 is shown as a straight tube but, for purposes set forth below, it may be formed with a generally forwardly and downwardly bowed central section terminating in straight end sections, similar in shape to the cross member 35 of FIGS. 1 and 2.

Each of the cross members 34, 35 carries means, described below, for mating with a motorcycle frame. The apparatus 25 of the Figures is suitable for use with a Kawasaki Model KZ650 motorcycle having two down tubes 23. Many makes and models of motorcycles have such a two-tube construction, but differ in specific geometry, as in tube diameter and spacing, fork head angle, the angle of the frame tubes relative to the fork head, and the angle of divergence of the tubes.

A mounting apparatus 25 designed for a specific motorcycle frame mates with that frame in only one position so that the mounting apparatus is located in a desired relationship to the frame. Measuring and alignment of the apparatus 25 are unnecessary, and the apparatus 25 cannot be incorrectly mounted.

Motorcycles which have only one down tube 23 may require a mounting apparatus which is fitted to the down tube and to a suitable second point on the frame, as a surface of the engine, fork head or the like. The specific mounting apparatus configuration is determined by the motorcycle design. It would unnecessarily complicate the disclosure to illustrate the variety of motorcycle frames which are in use.

The mounting apparatus 25 of the Figures has a pair of appropriately positioned split tubes 52 of arcuate cross section secured to the lower cross member 35, illustratively at the bends 46. The split tubes 52 are selected and oriented so as to mate with the down tubes 23 of a given motorcycle frame 15. When mated with the down tubes 23, the split tubes 52 may be secured thereto by any appropriate means, such as hose clamps (not shown) secured around the split tubes 52 and the down tubes 23.

A mounting plate 54 having a pair of laterally spaced mounting holes 56 is secured to the upper cross member 34, generally centrally thereof. For use on a motorcycle having a single down tube, such as a Yamaha Model XS400, for example, a mounting plate similar to plate 54 may substitute for the split tubes 52 on the lower cross member 35. In some cases, a pair of tabs may extend rearwardly from the upper cross member to mate with a frame element, such as for use on a Honda Model CB400 motorcycle, for example.

The apparatus 25 is mounted to the down tubes 23 by mating and securing the respective mounting means to the frame. In the apparatus 25 of the Figures, the split tubes 52 are mated with the down tubes 23 and means such as hose clamps are used to secure the split tubes 52 to the down tubes 23. The plate 54 is secured to the frame 15 by capturing a frame element, such as a gusset (not shown), between the plate 54 and a backing plate (not shown) having holes alignable with the holes 56. A pair of bolts and locknuts tightly secure the plate 54 and the backing plate to the frame element.

In the case of a motorcycle having a single down tube, such as the Yamaha Model XS400, a U-bolt extending around the down tube with its ends extending through the holes of a mounting plate may substitute for a backing plate.

The side plates 40, 42 each include an upwardly facing, generally longitudinally extending fairing mounting surface 30, preferably defined by a transversely extending flange 60. In the apparatus 25 of the Figures, the flange 60 extends outwardly from the upper edge of a plate portion 62 which extends forwardly from an integral rear plate portion 64 of each side plate 40, 42. Each flange 60 has a longitudinally spaced pair of mounting holes 65.

In a preferred form of the apparatus 25, the forward and rear side plate portions 62 and 64 are separated by a bend line 66, best seen in FIG. 1, extending downwardly and forwardly from a point between cross members 34 and 35. The rear plate portions 64 are parallel with each other and with the longitudinal center plane of the motorcycle, and the forward plate portions 62 converge forwardly from the bend line 66.

The apparatus 25 of the Figures further includes an outwardly extending flange 70 at the rear edge 71 of each plate rear portion 64. The flange 70 adds strength to each side plate 40, 42.

The forward plate portions 62 are preferably perforate in order to reduce the weight of the apparatus 25.

Figure 4:
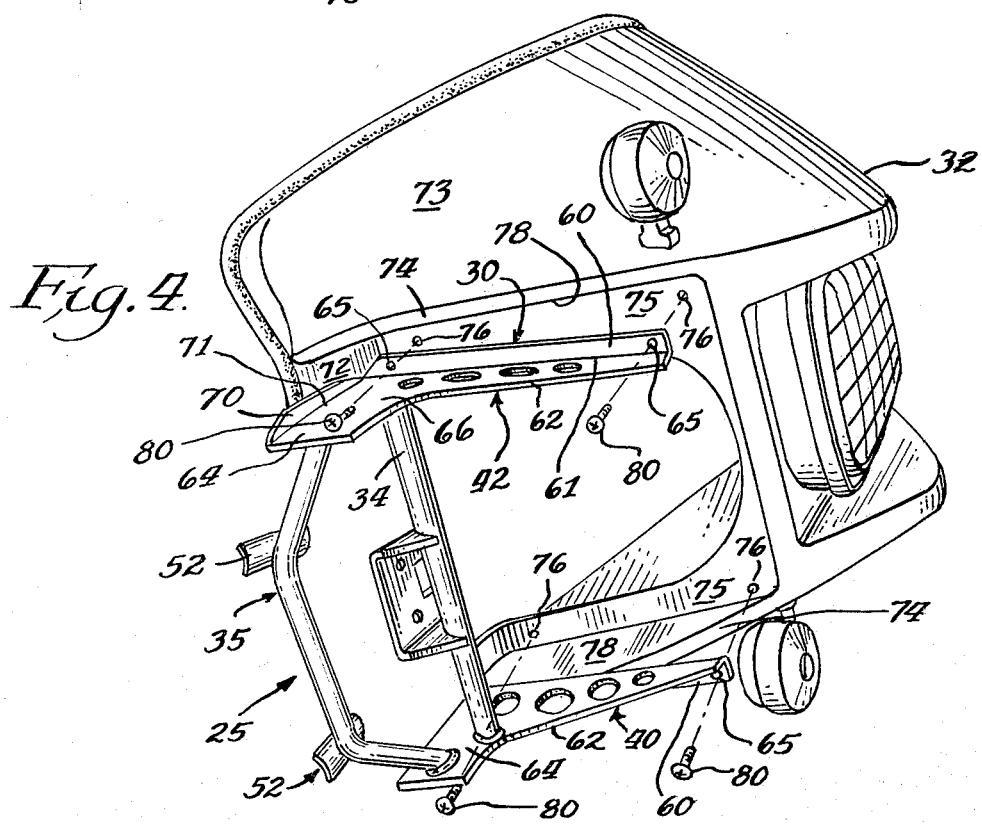
FIG. 4 is an exploded perspective of the fairing mounting apparatus and fairing of FIG. 1.

Referring to FIG. 4, the relationship of the apparatus 25 to the fairing 32 is more clearly illustrated. The fairing 32 is of a type marketed by the assignee hereof under the trademark "Quicksilver" and has an outer surface 72 having a pair of laterally spaced lower edges 74.

A pair of laterally spaced, downwardly facing, generally longitudinally extending fairing mounting surfaces 75 are spaced laterally inside respective sides of the outer surface 73 and are recessed upwardly from the lower edges 74. Each mounting surface 75 has a pair of longitudinally spaced bolt holes 76 alignable with the apparatus mounting surface holes 65. A side wall 78 extends between each mounting surface 75 and an associated lower edge 74.

After the apparatus 25 has been secured to the frame 15, the fairing 32 is readily mounted on and secured to the apparatus 25 by mutual engagement of the respective pairs of surfaces 30, 75, alignment of the associated pairs of bolt holes 65, 76, and insertion of mounting bolts 80 therethrough.

The fairing mounting apparatus described above provides several advantages over prior forms of fairing mounting apparatus. Firstly, the downwardly bowed shape of the lower cross member 35 allows a desired degree of spacing between the lower and upper mounting means 52, 54, while providing reduced spacing between the ends 36, 38 of the upper and lower cross members 34, 35 to result in reduced side plate height requirements.

Reduction of the required height of the side plates 40, 42 allows the apparatus to be substantially completely hidden from view when in place under the fairing 32, as in FIG. 4, in which the fairing mounting surfaces 75 are recessed upwardly from the fairing's lower edge 74. Further, the required height of the fairing inner sidewalls 78 is substantially reduced.

Selection of a mounting apparatus 25 having a forwardly and downwardly bowed upper cross member 34 as described above results in upward and rearward extension of the fairing supporting surfaces 30 in order to correctly position a relatively short fairing with respect to the rider.

Convergence of the forward side plate portions 62 effectively reduces the required width of the fairing 32. The Quicksilver ® fairing of FIG. 4 has a substantially reduced width compared to prior frame-mounted fairings, and hence is substantially lighter.

The foregoing detailed description is given for clearness of understanding only and no unnecessary limitations should be understood therefrom, as modifications will be obvious to those skilled in the art.

We claim:
1. In an apparatus for mounting a fairing on the frame of a motorcycle, said frame having at least one tube extending downwardly and rearwardly from the fork head of said frame and the fairing having a pair of laterally spaced, longitudinally extending, downwardly facing mounting surfaces, the mounting apparatus including a pair of vertically spaced, transversely extending cross members which mate with and are secured to said one frame tube, and a pair of plates secured to and extending forwardly from the ends of said cross members, said plates having laterally spaced, longitudinally extending upwardly facing fairing supporting surfaces to receive the mounting surfaces of the fairing, the imrovement wherein:

the lower of said cross members has a central portion which mates with the one frame tube and which is lower than the end portions thereof, the vertical spacing between the portions of the cross members which mate with the one frame tube being sufficient to provide stability and the height of said plates required to accommodate the ends of said cross members being minimized.

2. The fairing mounting apparatus of claim 1 in which the lower of said cross members has a central portion bowed downwardly from the end portions thereof.

3. The fairing mounting apparatus of claim 2 in which said lower cross member has a pair of laterally spaced bends therein defining a straight center section and two straight end sections, the center section mating with the motorcycle frame and the end sections being connected to said plates.

4. The fairing mounting apparatus of claim 1 in which the upper of said cross members has a central portion bowed generally forwardly and downwardly from the end portions thereof.

5. The fairing mounting apparatus of claim 4 in which said upper cross member has a pair of laterally spaced bends therein defining a straight center section and two straight end sections, the center section mating with the motorcycle frame and the end sections being connected to said plates.

6. In an apparatus for mounting a fairing on the frame of a motorcycle, said frame having at least one tube extending downwardly and rearwardly from the fork head of said frame and the fairing having a pair of laterally spaced, longitudinally extending, downwardly facing mounting surfaces, the mounting apparatus including a pair of vertically spaced, transversely extending cross members which mate with and are secured to said one frame tube, and a pair of plates secured to and extending forwardly from the ends of said cross members, said plates having laterally spaced, longitudinally extending, upwardly facing fairing supporting surfaces to receive the mounting surfaces of the fairing, the improvement wherein:

each of said plates has a rear portion secured to the ends of said cross members and is substantially parallel to the other rear plate portion, said pair of plates further having a forwardly converging pair of forward portions, said fairing supporting surfaces being defined by said forward plate portions.

7. The fairing mounting apparatus of claim 6 in which the juncture between the two portions of each of said pair of plates is defined by a bend line.

8. The fairing mounting of claim 7 in which said bend line is straight and extends downwardly and forwardly from a point between said cross members.

9. The fairing mounting apparatus of claim 8 in which said bend line intersects the rear edge of said plate, and said fairing supporting surface is defined by a flange extending transversely from the top edge of said plate.

* * * * *